UNITED STATES PATENT OFFICE.

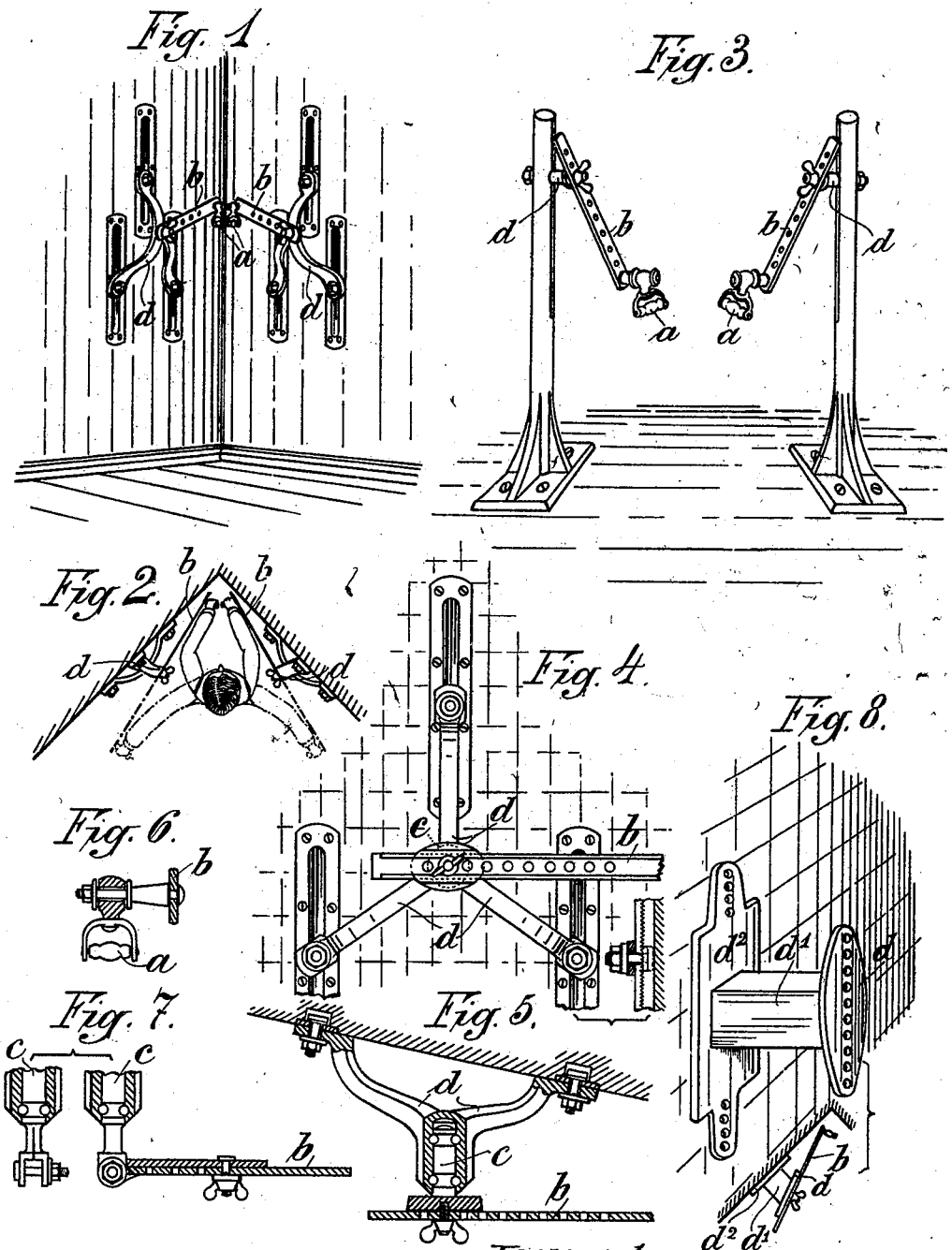

HINRICH LÜBBEN, OF HARTWARDERWURP, GERMANY.

EXERCISING-MACHINE.

SPECIFICATION forming part of Letters Patent No. 618,990, dated February 7, 1899.

Application filed January 25, 1898. Serial No. 667,943. (No model.)

*To all whom it may concern:*

Be it known that I, HINRICH LÜBBEN, farmer, a subject of the Grand Duke of Oldenburg, and a resident of Hartwarderwurp, in the Grand Duchy of Oldenburg, Germany, have invented certain new and useful Gymnastic Apparatus for Executing Arm-Circles, of which the following is a full and clear specification.

The invention has been patented in France August 10, 1897, No. 269,511.

My invention consists of an apparatus for gymnastic purposes, and especially for executing with the arms a motion where the stretched arms describe a circle. This motion is ordinarily difficult to perform, while with the apparatus hereinafter described it will be executed in an easy and regular manner.

My invention consists, essentially, of two handles attached to cranks by means of universal or ball-and-socket joints. It is constructed as follows, reference being had to the accompanying drawings, in which—

Figure 1 is a front view, and Fig. 2 a plan, of the apparatus when placed in the corner of a room. Fig. 3 is a view of the apparatus attached to two standards. Figs. 4 to 7 are details of the apparatus. Fig. 8 is a modification of the apparatus.

The handles $a$ are connected with the cranks $b$ by means of universal or ball-and-socket joints. The pivot is supported by a piece $d$, provided with three arms, these arms being guided in slots $e$, fitted in the wall, Figs. 1 and 2, or in the standard, Fig. 3, for the purpose of moving the cranks vertically, according to the size of the person using the apparatus. The length of the cranks can also be varied by fixing the pivot in one of the holes fitted in the crank, as shown in Figs. 4 and 5. In Fig. 7 the crank is connected to the pivot $c$ by means of a hinge-joint, whereby the angle between the crank and the wall may be varied and the crank fixed at any desired angle to the wall.

A very simple modification of the apparatus is shown in Fig. 8. The bearing $d'$ of the pivot is fixed directly to the wall by means of a wall-plate $d^2$, which is provided with several holes for the screws, thereby permitting an adjusting of the apparatus in vertical sense. The crank $b$ and the end plate $d$ of the pivot are also provided with several holes in order to permit a varying of the length of the crank.

What I claim as my invention, and desire to secure by Letters Patent, is—

1. In an exercising-machine for executing arm movements, the combination of a support, a crank pivoted thereto to assume various angles in relation to the pivot and free to move by the power of the person exercising applied to said crank at its outer end and a handle having a pivotal connection with the outer end of the said crank allowing said handle movement in a plurality of directions, substantially as described.

2. In combination in an exercising-machine for executing arm movements, a pair of pivoted cranks arranged to move in planes diverging from each other and handles pivotally attached to said cranks, substantially as described.

3. An exercising-machine comprising a support, a crank pivoted thereto in oblique relation to the wall to which the support is attached, and a handle having pivotal connection with the outer end of the said crank, substantially as described.

4. A gymnastic apparatus comprising a slotted support and a crank having a handle with a connection between the arm of said crank and said support to permit pivotal movement of the crank-arm, the said slotted support allowing a vertical adjustment of the parts to suit persons of different heights and without changing the sweep of the cranks.

Signed at Brake, Grand Duchy of Oldenburg, this 7th day of January, 1898.

HINRICH LÜBBEN.

Witnesses:
RICH. HORSTMANN,
H. AHLERS.